A. F. ROOT.
COTTON CHOPPER.
APPLICATION FILED APR. 23, 1912.
1,075,672.
Patented Oct. 14, 1913.
3 SHEETS—SHEET 1.
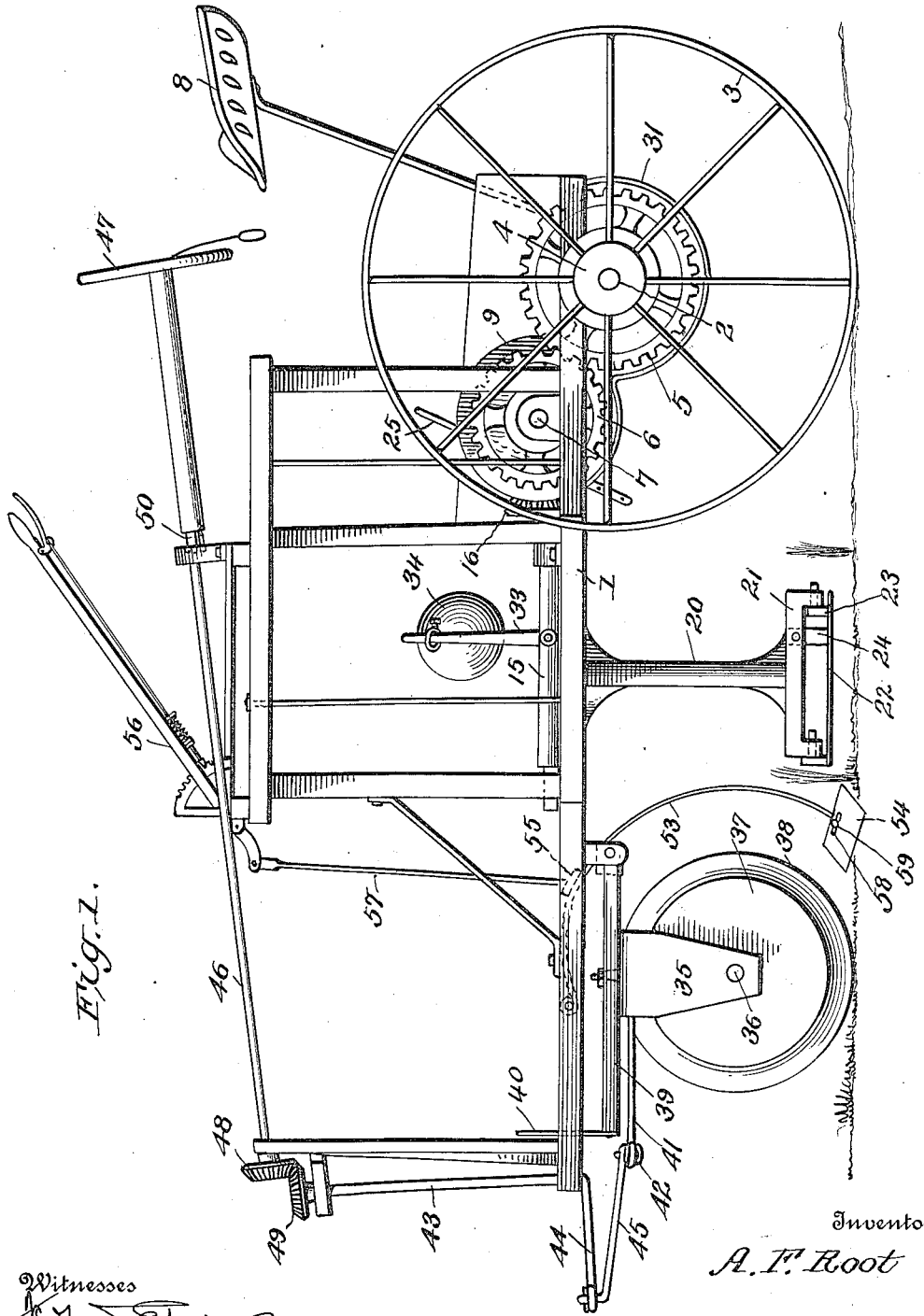

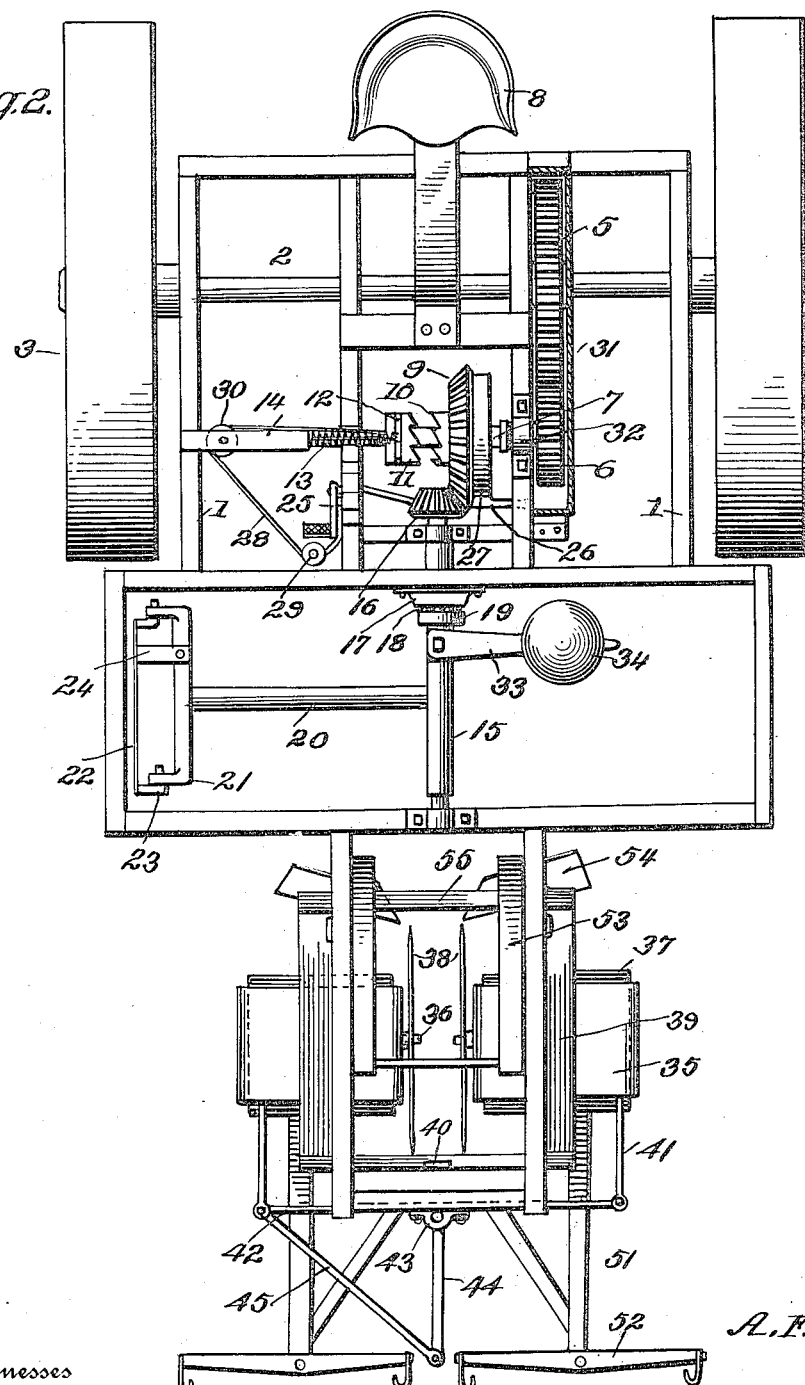

A. F. ROOT.
COTTON CHOPPER.
APPLICATION FILED APR. 23, 1912.
1,075,672.
Patented Oct. 14, 1913.
3 SHEETS—SHEET 3.
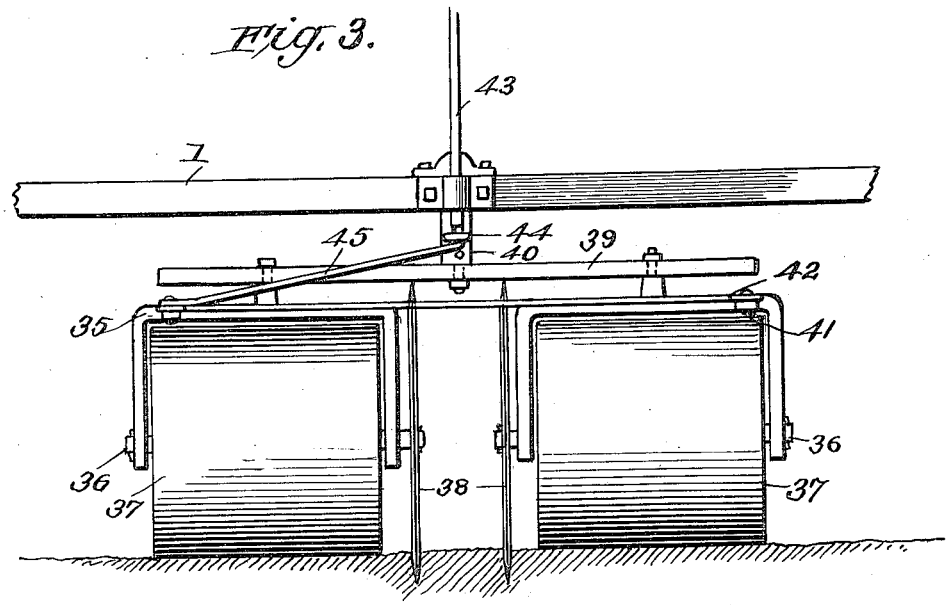
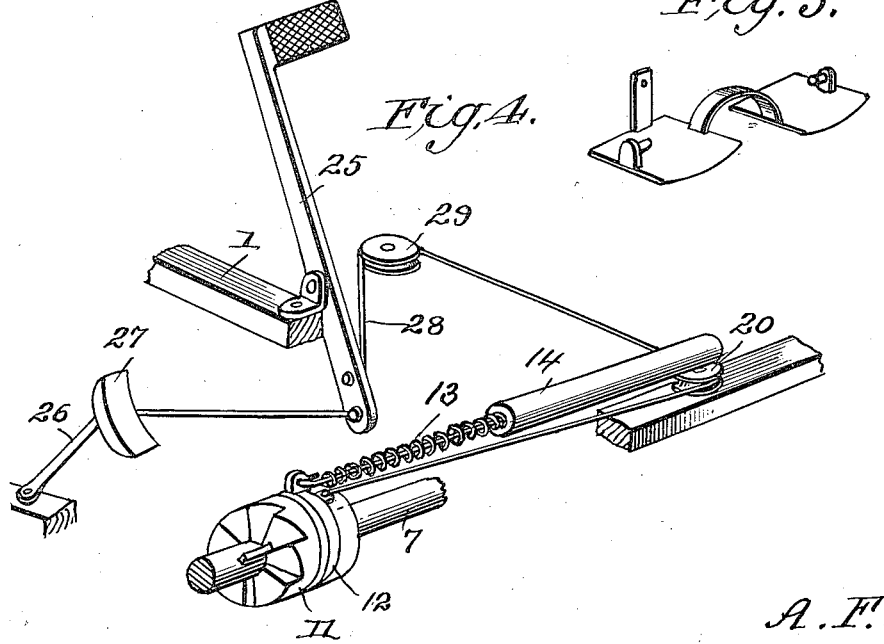
Inventor
A. F. Root

UNITED STATES PATENT OFFICE.

ALBERT F. ROOT, OF RED FORK, OKLAHOMA.

COTTON-CHOPPER.

1,075,672.

Specification of Letters Patent. Patented Oct. 14, 1913.

Application filed April 23, 1912. Serial No. 692,740.

*To all whom it may concern:*

Be it known that I, ALBERT F. ROOT, a citizen of the United States, residing at Red Fork, in the county of Tulsa and State of Oklahoma, have invented certain new and useful Improvements in Cotton-Choppers, of which the following is a specification.

This invention has relation to cotton choppers, and has for its object to provide a machine of simple and durable structure carrying a blade mounted for movement about a horizontal axis, the said blade being adapted to chop out the undesirable plants standing in a row at certain predetermined intervals and leave certain of the plants standing.

A further object of the invention is to provide a machine which may be easily and quickly transformed from a chopper to a cultivator, and vice versa.

With the above objects in view the machine includes a wheel mounted frame having a shaft journaled thereon and means for rotating the said shaft from the supporting wheels of the frame. This shaft carries a blade. Means are provided for interrupting the operative connection between the shaft and the supporting wheels and at the same time for applying a brake to the movable parts in order to bring them promptly to a state of rest. The shaft that carries the blade is so weighted as to have a tendency to move the blade to its uppermost position when the operative connection between the shaft and the wheels is interrupted. The frame is supported at its forward end upon trucks, there being an adjustable connection provided whereby the depth at which the blade will operate in the soil may be regulated. These trucks include disks and rollers adapted to travel at the sides of the row of plants. Scrapers are carried at the forward part of the same frame and operate in the soil behind the rollers and just outside of the incisions made in the soil by the disks. The scrapers remove the soil from the sides of the row of plants so that the blade during its chopping operation is moved through a comparatively thin ridge or hill in the soil. The machine is especially adapted to be pulled by draft animals, and is in a great measure guided by the said animals notwithstanding the fact that provision is made for manually steering the trucks under the forward part of the frame of the machine.

For a full understanding of the invention, reference is to be had to the following description and accompanying drawings in which:

Figure 1 is a side elevation of the cotton chopper. Fig. 2 is a top plan view of the same. Fig. 3 is a front elevation of a portion of the same. Fig. 4 is a perspective view of parts of the chopper. Fig. 5 is a perspective view of a modified form of blade which may be used upon the chopper.

Corresponding and like parts are referred to in the following description and indicated in all the views of the accompanying drawings by the same reference characters.

The machine consists of a frame 1 which is mounted at its rear part upon an axle 2 which in turn is supported upon ground wheels 3. These wheels are provided at their hubs with escapement devices indicated at 4, and inasmuch as these devices are common in agricultural machines of this character, it is considered unnecessary to explain their detail structure, they being so arranged that the wheels 3 may rotate in a backward direction without rotating the axle 2, but when the wheels 3 rotate in a forward direction they rotate the axle 2. This escapement is desirable and necessary in order to permit the machine to be readily turned around.

A gear wheel 5 is fixed to the axle 2 and meshes with a gear wheel 6 which is fixed to an end of the shaft 7 journaled upon the frame 1. An operator's seat 8 is mounted upon the frame 1 at a point preferably between the traction wheels 3. A bevel gear wheel 9 is journaled upon the shaft 7 and is provided with a clutch hub 10. A clutch member 11 is slidably mounted upon the shaft 7 and is arranged to rotate in unison with the shaft. The clutch member 11 is journaled in a ring 12 and one end of a spring 13 bears against the said ring, and the other end of the said spring bears against the end of a pipe 14 which is carried by the frame 1. This spring is under tension with a tendency to force the clutch member 11 upon the clutch hub 10 of the wheel 9. A shaft 15 is journaled upon the frame 1 and carries at its rear end a beveled pinion 16 which meshes with the beveled gear wheel 9. A thrust bearing 17 having anti-friction balls or similar devices 18 is mounted upon the frame 1, and the shaft 15 is provided with a shoulder 19 which engages the said balls, whereby the said shaft 16 is restrained against longitudinal movement and is free to rotate when the clutch member 11 is in engagement with the hub 10. An arm 20 is fixed to the shaft 15 and is disposed with its long dimension at a right angle to the axis of the shaft. This arm is provided at its outer end with branches 21 to which is connected a blade 22 by means of lugs 23 attached to the said blade and connected with the ends of the said branches. A brace 24 is interposed between one of the branches 21 and the intermediate portion of the blade 22, and is adapted to rigidly hold the blade in position upon the said branches.

A lever 25 is fulcrumed upon the frame 1 and is connected at its lower end with a beam 26 fulcrumed upon the frame 1. This beam carries a brake shoe 27 which is adapted to engage the periphery of the wheel 9 when the said lever is swung, and thereby bring the wheel 9 and the parts operatively connected therewith to a state of rest when the clutch member 11 is disengaged from the hub 10. A cable 28 is connected at one end with the said lever 25 and is trained around a pulley 29 attached to the frame 1 and a pulley 30 mounted upon the frame 1 at the outer end portion of the pipe 14. The other end of the said cable is attached to the ring 12 mounted upon the clutch member 11; therefore it will be seen that at the time that the lever 25 is swung and the brake shoe is brought into engagement with the periphery of the wheel 9, the cable 28 is moved longitudinally whereby the clutch member 11 is drawn away from the clutch hub 10 against the tension of the spring 13. It is also apparent that when the lever 25 is permitted to swing in consequence of the spring 13 forcing the clutch member 11 into engagement with the clutch hub 10 that the said lever will move the brake beam 26 and shoe 22 away from the periphery of the wheel 9.

The wheels 5 and 6 are incased in a hood 31 mounted upon the frame 1 and the shaft 7 is journaled in an anti-friction thrust bearing 32 mounted upon the frame 1, whereby the said shaft and the wheel 9 are restrained against movement in the direction of the axis of the shaft. An arm 33 is carried by the shaft 15 and is disposed in an opposite direction from the axis of the said shaft from that in which the arm 20 is disposed. A weight 34 is carried at the outer end of the arm 33, and this weight is sufficiently heavy to bring the arm 21 to a vertical position above the shaft 15 when the clutch member 11 is disengaged from the hub of the wheel 9. Therefore when the chopping operation of the blade is interrupted, the said blade, and the arm which carries the same, is elevated and held in an elevated position so that the said blade and arm will not come in contact with obstacles or obstructions upon the ground.

Truck frames 35 are located under the forward portion of the frame 1 at the sides thereof. Shafts 36 are journaled in the truck frames 35 and rollers 37 are fixed to the shafts 36 between the ends of the frames 35. Disks 38 are fixed to the inner ends of the shafts 36 beyond the inner ends of the truck frames 35. The frames 35 are pivoted directly to a frame 39, and this frame is pivotally connected at its rear part with the forward portion of the frame 1. A bar 40 is carried at the forward part of the frame 39 and adjustably engages the forward end portion of the frame 1. Therefore it will be seen that by adjusting the bar 40 in the frame 1 the forward part of the frame 1 may be raised or lowered, whereby the depth at which the blade 22 will operate in the soil may be regulated. Rods 41 are connected at their rear ends with the outer ends of the frames 35, and the forward ends of the rods 41 are pivotally connected by a cross rod 42. A shaft 43 is journaled at the forward end of the frame 1 and is provided with a forwardly disposed arm 44. A rod 45 is pivotally connected at one end with the forward end of the arm 44 and at its other end is pivotally connected with one of the rods 41. A shaft 46 is journaled upon the frame 1 and is provided at its rear end with a hand wheel 47 which is located in reach of one occupying the seat 8. A beveled pinion 48 is fixed to the forward end of the shaft 46 and meshes with a beveled pinion 49 fixed to the upper end of the shaft 43. Any suitable means, as, for instance, a pawl and ratchet device indicated at 50, may be employed for holding the shaft 46 against rotation. It will be seen that when the parts of the pawl and ratchet mechanism are disengaged from each other and the wheel 47 is turned, the shaft 46 is rotated, whereby the shaft 43 is turned through the intermeshing pinions 48 and 49, and the rod 42 is moved longitudinally, whereby the rods 41 are swung and the truck frames 35 are turned. This will steer the rollers 37 and the disks 38 along the sides of the row of plants. Draft bars 51 are attached to the forward end of the frame 1, and swingle trees 52 are pivotally mounted at the forward end of the said bars in the usual manner. The draft animals are hitched to the said swingle trees.

Spring arms 53 are pivoted at their upper ends to the forward part of the frame 1, and these arms extend down behind the rollers 38. Scraper blades 54 are carried at the lower ends of the arms 53 and are adapted to operate in the soil behind the rollers 37. A cross bar 55 connects the arms 53. A lever 56 is fulcrumed upon the frame 1, and one end of the said lever is connected by means of a rod 57 with the cross bar 55. It is apparent that by swinging the lever 56 that the rod 57 will be moved longitudinally, and by the connecting cross bar 55 the rear ends of the arms 53 may be raised or lowered, consequently the blades 54 may be positioned to operate at a desired distance below the surface of the soil. During the operation of thinning the cotton the outer ends of the blades 54 are rearwardly disposed with relation to their inner ends. When, however, it is desired to cultivate the cotton, the positions of the said blades are reversed so that the inner ends thereof are rearwardly disposed with relation to their outer ends. This will cause the said blades to cast the soil toward the plants left standing in the row. The blades 54 are provided with elongated slots 58 through which securing bolts 59 pass. These bolts are also secured to the arms 53, and, consequently, the blades may be adjusted so that the spaces between their inner ends may be increased or diminished as desired.

The operation of the machine as a chopper is as follows: The machine is drawn along a row of standing plants and the plants pass through the space between the disks 38. The disks 38 make incisions in the soil at the opposite sides of the row of plants, and the rollers 37 have sufficient frictional contact with the soil to hold the forward part of the machine steady in its course and prevent the frame from having undue vibration in consequence of the force of impact when the blade 22 strikes the ground. The blades 54 following the rollers 32 engage the soil and break the same away from the incisions made by the disks 38; therefore the soil between the incisions made by the said disks is left in a ridge which stands up several inches above the furrows made by the blades 54. The plants in the row are approximately at the middle of this ridge. When the blade 22 revolves about the axis of the shaft 16 it strikes the side of this ridge and cuts out a number of the plants in the row, and also throws the material thus cut to one side of the row. The parts of the machine are so assembled and timed that at each rotation of the shaft 15 the blade 22 will cut out material in the ridge approximately 13 inches in length and will leave material undisturbed in the ridge for the length of approximately 3 inches. Therefore some of the plants are left standing and some are chopped out. After plants have been thinned in the manner above indicated, the positions of the blades 54 may be reversed in their positions and the machine passed along the plants so that the blades will cast the soil back toward the plants left standing in the row. Therefore it will be seen that a machine is provided which may be easily and quickly transformed from a chopper to a cultivator and vice versa. And when arranged as a chopper the parts will coöperate to effectually remove from the row of plants the undesirable plants at predetermined intervals.

Having thus described the invention, what is claimed as new is:

1. A cotton chopper comprising a wheel mounted frame, a blade mounted upon the frame for rotation about an axis, a weight connected with the blade and adapted to hold the same above the axis when inactive, means for operating the blade from the supporting wheels, and means for interrupting the operative connection between the blade and the wheels.

2. A cotton chopper comprising a wheel mounted frame, a blade mounted on the frame for rotation about an axis, means for holding the blade in an elevated position with relation to the axis when inactive, means for operating the blade from the supporting wheels, a brake and means for simultaneously applying the brake and interrupting the operative connection between the blade and the wheels.

3. A cotton chopper comprising a wheel mounted frame, a shaft journaled thereon and carrying a blade, a wheel journaled upon the frame and operatively connected with the supporting wheels and operatively connected with the shaft, a clutch member engageable with the wheel, lever mechanism operatively connected with the clutch member, and a brake adapted to operate upon the wheel and connected with said lever mechanism.

4. A cotton chopper comprising a wheel mounted frame, a shaft journaled thereon, a blade carried by said shaft, a clutch member movably mounted upon the frame and engageable with the wheel, means for rotating the clutch member from the supporting wheels, a spring acting upon the clutch member and normally holding the same toward the wheel, a lever fulcrumed upon the frame, and a brake pivoted upon the frame and engageable with the wheel and operatively connected with the lever.

In testimony whereof I affix my signature in presence of two witnesses.

ALBERT F. ROOT. [L. S.]

Witnesses:
B. F. PETTUS,
JANET HART.

Copies of this patent may be obtained for five cents each, by addressing the "Commissioner of Patents, Washington, D. C."